July 8, 1969   SATOSHI TARUTANI ET AL   3,453,899
EXPOSED SPEED CHANGE MECHANISM OF BICYCLE
Filed Dec. 18, 1967
FIG. 1
FIG. 2
FIG. 3
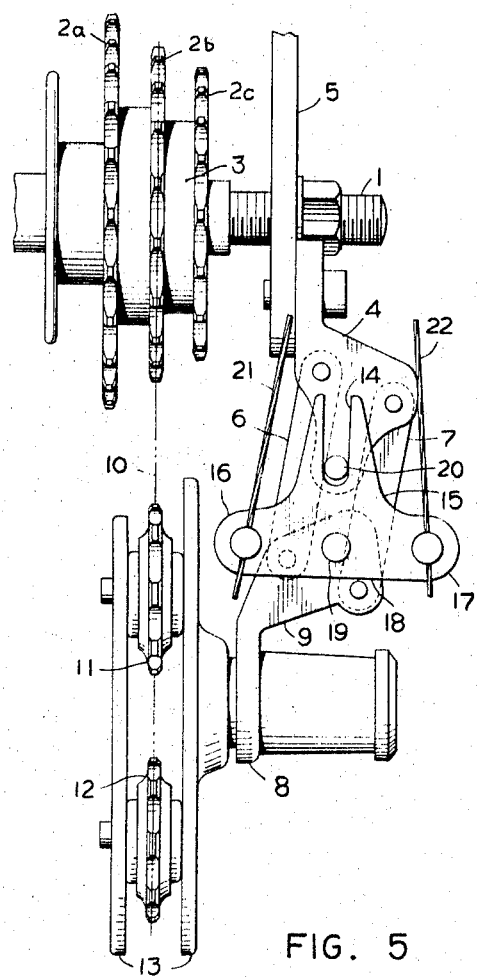
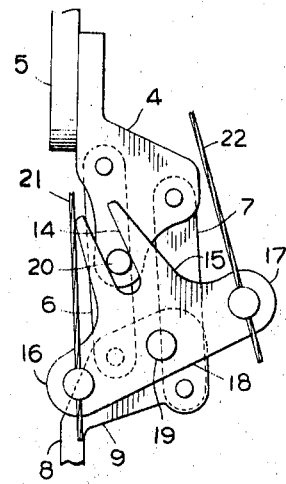
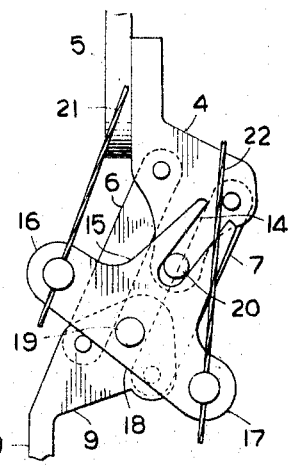
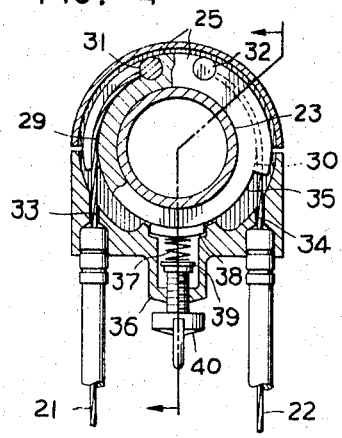
FIG. 4
FIG. 5
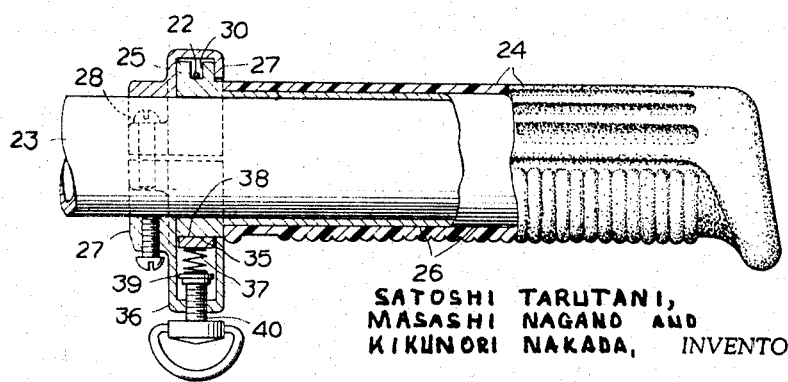
SATOSHI TARUTANI,
MASASHI NAGANO AND
KIKUNORI NAKADA, INVENTORS United States Patent Office 3,453,899
Patented July 8, 1969

1

3,453,899
EXPOSED SPEED CHANGE MECHANISM OF BICYCLE
Satoshi Tarutani, Masashi Nagano, and Kikunori Nakada, Sakai, Japan, assignors to Shimano Kogyo Kabushiki Kaisha, Sakai, Japan
Filed Dec. 18, 1967, Ser. No. 691,633
Claims priority, application Japan, Dec. 23, 1966, 41/117,230, 41/117,231
Int. Cl. F16h *11/08*
U.S. Cl. 74—217               2 Claims

ABSTRACT OF THE DISCLOSURE

An exposed speed change mechanism comprising a multistage sprocket wheel assembly mounted on a rear wheel axle of the bicycle, said sprocket wheel assembly consisting of a plurality of sprocket wheels of different diameter disposed in parallel, in which the driving chain is adapted to be shifted into engagement with the adjacent higher speed or with the lower speed sprocket wheel by means of a parallelogram frame which is selectively actuated in one or other direction through an oscillatable plate operatively connected to the chain shifter or change-over guide wheel, said oscillatable plate being adapted to be oscillated in one or other direction by means of either one of two Bowden wires manipulated by the handle grip of the bicycle.

---

In the conventional exposed speed change mechanism of a bicycle of the above type, employing a pantograph or parallelogram frame, the said parallelogram frame is normally maintained in a position moved in one direction by means of a strong spring, and when shifting the driving chain guide wheel said parallelogram frame is moved in the opposite direction by means of a Bowden wire against the action of said strong spring. Under the circumstances, the manual control device is usually arranged somewhat apart from the bicycle handle bar, so that there might happen some dangerous result at the time of change-over of the driving speed.

The principal object of the present invention is to provide an improved speed change mechanism of the above type, in which the above mentioned disadvantages have been removed by dispensing with the employment of the strong spring for normally biasing the parallelogram frame, and wherein the actuation of the parallelogram frame may be readily effected by rotating the handle grip of the bicycle.

Other objects and advantages of the invention will become apparent from the following description, when taken in conjunction with the accompanying drawings in which:

FIGURE 1 is a rear view of the speed change mechanism according to the present invention;

FIGURE 2 is a rear view of the essential part only of the mechanism as shown in the high speed drive condition;

FIGURE 3 is a similar view as shown in the low speed drive condition;

FIGURE 4 is a cross-sectional view of a bicycle handle bar with a control device for the speed change mechanism shown in FIGURE 1; and FIGURE 5 is a longitudinal section thereof.

Referring to FIG. 1, at the righthand end portion of a rear wheel axle 1 of a bicycle, there is mounted a multistage sprocket wheel assembly consisting of a plurality of sprocket wheels 2a, 2c, 2b and 2c having different number of teeth or of different diameter, the smallest sprocket wheel 2c, i.e. the highest speed sprocket wheel being arranged on the outermost position as shown. Said plurality of sprocket wheels are mounted on a usual free wheel 3, forming thereby a multistage sprocket wheel assembly. To a support 5 securely mounted to the righthand end portion of the axle 1, there is mounted a descending mount seat 4. This mount seat has a pair of links 6 and 7 pivoted to the lower end of said seat 4. The lower ends of the links 6 and 7 are pivoted to a reciprocator 9 which forms the upper part of an actuator arm 8, forming one link of a parallelogram frame.

10 is a driving chain wound around a usual crank sprocket wheel of a bicycle (not shown) and one of the said plurality of sprocket wheels on the rear wheel axle 1. 11 is a guide wheel engaging the driving chain 10 and adapted for shifting the chain toward any adjacent sprocket wheel on the multistage sprocket wheel assembly, and 12 is a tensioning wheel for the driving chain. Said guide wheel 11 and the tensioning wheel 12 are supported by a change-over frame 13 which is operatively connected to the actuator arm 8.

The parts heretofore described are to be considered as conventional parts of an exposed speed change gear mechanism of a bicycle having a multistage sprocket wheel assembly on the rear axle of a bicycle, and it is with these parts that the present invention is adapted to be associated.

According to the present invention, an improved means for imparting desired change-over action to said change-over frame 13 is provided, which will be described as follows: As shown in FIGS. 1, 2 and 3, an oscillatable plate 18 having a fork 15 with a slot 14 and arms 16 and 17 extending at right angle to said slot 14 is pivoted at 19 to the reciprocation arm 9. The mount seat 4 has a pin 20 slidably engaging with the slot 14 of the fork 15. The arms 16 and 17 of the oscillatable plate 18 are connected by means of Bowden wires 21 and 22, respectively, to a control device to be described hereinafter. When the Bowden wire 22 is pulled upwardly, the plate 18 having the pivot 19 will be turned around the pin 20 in the counter-clockwise direction as shown in FIG. 2, whilst when the Bowden wire 21 is pulled upwardly the plate 18 will be turned in the clockwise direction as shown in FIG. 3, so that the parallelogram frame 4–6–7–9 will be subjected to parallelogrammic motion, rightwardly or leftwardly. In the above manner, the change-over frame 13 connected to the actuator arm 8 may be shifted, thereby the driving chain 10 may be shifted, thereby shifting the driving chain into engagement with the high speed sprocket wheel 2c (in the case of FIG. 2) or into engagement with the low speed sprocket wheel 2a (in the case of FIG. 3).

While in the drawing the oscillatable plate 18 is mounted on the reciprocatable arm 9 of the actuator arm 8, if desired, this oscillatable plate 18 may be mounted to another element of the parallelogram frame, i.e. the mount seat 4, the link 6 or 7, whereby it will be able to obtain desired motion of the actuator arm 8 connected to the change-over frame 13.

The Bowden wire control device is shown in FIGS. 4 and 5, wherein 23 is a bicycle steering handle bar having a grip portion 24. A guide ring 25 having an extension sleeve 26 is loosely mounted on the handle bar 23, and the grip 24 is fixed to the sleeve 26. Said guide ring 25 is surrounding by a split housing 27 united together by means of a screw 28. The guide ring 25 is provided with peripheral grooves 29 and 30, and the upper ends of the Bowden wires 21 and 22 passing through said peripheral grooves are fixed to rigid points 31 and 32 respectively. The Bowden wires 21 and 22 are passed outwardly through symmetrically arranged tangential passages 33 and 34, respectively. The lower half of the guide ring 25 has a peripheral frictional face 35. The lower portion of the housing 27 is provided with a radially projected box 36, wherein a brake shoe 38 biased by a spring 37 is provided. 40 is a screw for adjusting the strength of the brake spring 37.

When the guide ringe 25 is rotated by manipulating the grip 24, any one of the Bowden wires 21 and 22 will be pulled in upwardly under tension, against the brake effect of the brake shoe 38, and the other Bowden wise will be projected downwardly under slackened state. Upon thus effecting the desired change-over of the speed change mechanism, any accidental rotation of the guide ring 25 will be prevented by the braking effect of the brake shoe 38 biassed by the spring 37.

From the foregoing, it will be seen according to the present invention that the conventional parallelogram frame for effecting the shift of the change-over frame 13 is controlled by the oscillatable plate which is adapted to be controlled through the Bowden wires manipulated by selectively rotating the handle grip in either direction, and that there is no need of providing any strong spring for actuating in one direction the parallelogram frame, which necessitated the provision of separate control device, so that the safety manipulation of change-over of the speed change mechanism would be expected.

What we claim is:

1. In an exposed speed change mechanism for a bicycle equipped with a multistage sprocket wheel assembly mounted on a rear wheel axle of the bicycle and a parallelogram frame adapted by parallelogrammic motion to carry out change-over of the desired sprocket wheel, a control device comprising an oscillatable plate having two side arms, said oscillatable plate being pivoted to one element of said parallelogram frame, said oscillatable plate also being in engagement with a pin on another element of said parallelogram frame, a change-over frame having a chain guide wheel and being connected to the first element of said parallelogram frame, and two Bowden wires, one of which is connected to one side arm, and the other of which is connected to the other side arm of said oscillatable plate, the arrangement being such that by pulling one or the other of said Bowden wires said change-over frame having the chain guide wheel is shifted in one or the other direction.

2. The exposed speed change mechanism of a bicycle as recited in claim 1, wherein said control device comprises a guide ring having a handle grip, with said guide ring being rotatably mounted on a handle bar of the bicycle, said two Bowden wires being fixed at their upper ends to said guide ring in such manner that when the guide ring is rotated by the handle grip one Bowden wire is pulled in under tension, while the other Bowden wire is pulled out and slackened, said guide ring having a friction face for cooperation with a spring biassed brake shoe adapted to apply a braking effect on said friction face upon completion of the movement of said Bowden wires.

References Cited

UNITED STATES PATENTS

| | | | |
|---|---|---|---|
| 2,108,941 | 2/1938 | Morgan | 74—217 |
| 2,428,166 | 9/1947 | Letourneur | 74—217 |
| 2,431,513 | 11/1947 | Schwinn | 74—217 |

FOREIGN PATENTS

| | | |
|---|---|---|
| 1,032,933 | 4/1953 | France. |

FRED C. MATTERN, JR., *Primary Examiner.*

J. A. WONG, *Assistant Examiner.*

U.S. Cl. X.R.

74—242